US012640116B2

(12) United States Patent
Cai et al.

(10) Patent No.: US 12,640,116 B2
(45) Date of Patent: May 26, 2026

(54) IMAGE DISPLAY METHOD AND APPARATUS, ELECTRONIC DEVICE, AND MEDIUM

(71) Applicant: Nothing Technology Limited, London (GB)

(72) Inventors: Liwu Cai, Shenzhen (CN); Minling Huang, Shenzhen (CN); SingYu Lam, London (GB)

(73) Assignee: Nothing Technology Limited, London (GB)

( * ) Notice: Subject to any disclaimer, the term of this patent is extended or adjusted under 35 U.S.C. 154(b) by 0 days.

(21) Appl. No.: 18/952,088

(22) Filed: Nov. 19, 2024

(65) Prior Publication Data

US 2025/0182716 A1 Jun. 5, 2025

(30) Foreign Application Priority Data

Nov. 30, 2023 (CN) .......................... 202311628878.5

(51) Int. Cl.
*G09G 5/02* (2006.01)
*G06T 7/33* (2017.01)

(52) U.S. Cl.
CPC ............... *G09G 5/02* (2013.01); *G06T 7/344* (2017.01); *G06T 2207/10024* (2013.01); *G09G 2340/10* (2013.01)

(58) Field of Classification Search
CPC ...... G09G 5/02; G09G 2340/10; G06T 7/344; G06T 2207/10024; G06T 11/60; G06T 11/001; G06F 9/451; G06F 3/04845; G06F 3/1407
See application file for complete search history.

(56) References Cited

U.S. PATENT DOCUMENTS

2020/0410955 A1 * 12/2020 Walker ..................... G09G 5/06

FOREIGN PATENT DOCUMENTS

| CN | 106502606 A | 3/2017 | |
| EP | 2799984 A2 * | 11/2014 | ............. G06F 9/451 |
| WO | WO-2018072581 A1 * | 4/2018 | ............. G06F 3/147 |

* cited by examiner

*Primary Examiner* — Towfiq Elahi
(74) *Attorney, Agent, or Firm* — Calfee, Halter & Griswold LLP

(57) ABSTRACT

An image display method includes the following. An original image is displayed. Dominant colors and feature positions of the original image are obtained, where each feature position corresponds to one dominant color, and different feature positions correspond to different dominant colors. A target pattern is generated for each feature position, where a color of the target pattern includes a dominant color corresponding to the feature position. The target pattern is displayed at the feature position. The target pattern is transformed and at least part of a dynamic process of a target pattern transformation is displayed.

17 Claims, 10 Drawing Sheets

S110

DISPLAY AN ORIGINAL IMAGE

S120

OBTAIN DOMINANT COLORS AND FEATURE POSITIONS OF THE ORIGINAL IMAGE

S130

GENERATE A TARGET PATTERN FOR EACH FEATURE POSITION

S140

DISPLAY THE TARGET PATTERN AT THE FEATURE POSITION

S150

TRANSFORM THE TARGET PATTERN, AND DISPLAY AT LEAST PART OF A DYNAMIC PROCESS OF A TARGET PATTERN TRANSFORMATION

S410

GENERATE A SECOND POLYGON FOR ANY ONE OF THE FEATURE POSITIONS

S420

RANDOMLY MOVE EACH VERTEX OF THE SECOND POLYGON FOR A DISTANCE IN A FEATURE DIRECTION OF THE VERTEX, TO OBTAIN THE FIRST POLYGON

S910

DETERMINE A GRAVITY CENTER OF THE
TARGET PATTERN

S920

APPROXIMATE THE TARGET PATTERN AS
A COMBINATION OF MULTIPLE
TRIANGLES WITH THE GRAVITY CENTER
AS A VERTEX

S930

FILL THE MULTIPLE TRIANGLES WITH
COLOR

IMAGE DISPLAY METHOD AND APPARATUS, ELECTRONIC DEVICE, AND MEDIUM

CROSS-REFERENCE TO RELATED APPLICATIONS

This application claims priority under 35 U.S.C. § 119 (a) to Chinese Patent Application No. 2023116288785, filed Nov. 30, 2023, the entire disclosure of which is incorporated herein by reference.

TECHNICAL FIELD

The present disclosure relates to the field of intelligent terminal technology, and in particular, to an image display method and apparatus, an electronic device, and a medium.

BACKGROUND

Currently, wallpapers on a cell phone are usually static, and dynamic wallpapers often consist of a limited quantity of specific images that need to be made in advance before they can be used. In the related art, after users select a recommended artwork or select a photo from their own galleries as a wallpaper, an original image will be displayed on the lock screen interface, and a blurred photo will be displayed after switching to the home screen. This method simply performs a blurring process on the image, while the wallpaper is static on both the lock screen and the home screen, which is not really a dynamic wallpaper.

SUMMARY

In one aspect of embodiments of the disclosure, an image display method is provided. The method includes the following. An original image is displayed. Dominant colors and feature positions of the original image are obtained, where each feature position corresponds to one dominant color, and different feature positions correspond to different dominant colors. A target pattern is generated for each feature position, where a color of the target pattern includes a dominant color corresponding to the feature position. The target pattern is displayed at the feature position. The target pattern is transformed and at least part of a dynamic process of a target pattern transformation is displayed.

In another aspect of embodiments of the disclosure, an electronic device is provided. The electronic device includes a display screen, at least one processor, and a memory communicated with the at least one processor. The memory stores an instruction executable by the at least one processor, and the instruction, when executed by the at least one processor, causes the at least one processor to drive the electronic device to: display an original image; obtain dominant colors and feature positions of the original image, wherein each feature position corresponds to one dominant color, and different feature positions correspond to different dominant colors; generate a target pattern for each feature position, wherein a color of the target pattern comprises a dominant color corresponding to the feature position; display the target pattern at the feature position; and transform the target pattern, and display at least part of a dynamic process of a target pattern transformation.

In another aspect of embodiments of the disclosure, a non-transitory computer readable storage medium is provided. The non-transitory computer readable storage medium stores a computer readable instruction which, when executed by a processor, causes the processor to: display an original image; obtain dominant colors and feature positions of the original image, wherein each feature position corresponds to one dominant color, and different feature positions correspond to different dominant colors; generate a target pattern for each feature position, wherein a color of the target pattern comprises a dominant color corresponding to the feature position; display the target pattern at the feature position; and transform the target pattern, and display at least part of a dynamic process of a target pattern transformation.

BRIEF DESCRIPTION OF THE DRAWINGS

Other features, objects and advantages of the disclosure will become more apparent from the following detailed description of non-limiting embodiments in conjunction with the accompanying drawings, in which.

DETAILED DESCRIPTION

The exemplary embodiments of the present disclosure will be described in details with reference to the accompanying drawings to enable those skilled in the art to easily implement them. Furthermore, for clarity of descriptions, those parts irrelevant to the descriptions of the exemplary embodiments are omitted in the accompanying drawings.

In the present disclosure, it may be understood that the terms such as "include" or "have" are intended to indicate presence of feature, digit, step, behavior, component, part or combination thereof disclosed in the specification and do not preclude the possibility of presence or addition of one or more other features, digits, steps, behaviors, components, parts or combination thereof.

Further, it may be noted that in a case of no conflicts, the embodiments of the present disclosure and the features in the embodiments may be combined with each other.

According to embodiments of the disclosure, a user can choose an image and set the image as a dynamic wallpaper of a cell phone. When the cell phone is locked, the original image is displayed on the lock screen. When the user unlocks the cell phone, the image disappears and the wallpaper is switched into multiple random curved shapes of colors generated by extracting dominant colors from the image. Those random curved shapes rotate and move randomly, and the wallpaper gradually becomes blurry. After a certain period of time (for example, 3 seconds), the wallpaper stops moving. Through technical processing of images, a static image can be processed into a dynamic image, and dynamic effects are displayed to provide a dynamic wallpaper. In the disclosure, dominant colors of an image are extracted and target patterns are generated at feature positions, so that the color of background and the colors of target patterns on the dynamic wallpaper are taken from the original image, thereby making the conversion process relatively natural.

In combination with the accompanying drawings, technical solutions provided in embodiments of the disclosure will be described in detail in the following.

Figure 1:
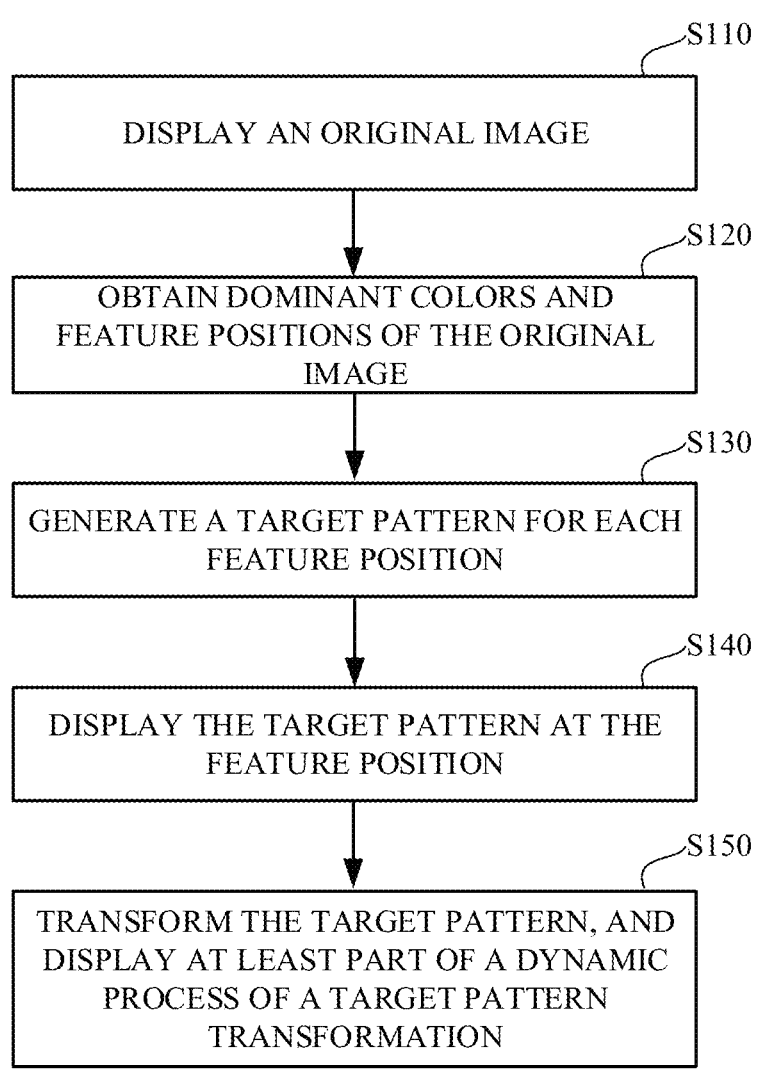
FIG. 1 is a schematic flow chart of an image display method provided in an embodiment of the disclosure.

FIG. 1 is a schematic flow chart of an image display method provided in an embodiment of the disclosure.

As illustrated in FIG. 1, the image display method includes operations at S110-S150.

At S110, an original image is displayed.

At S120, dominant colors and feature positions of the original image are obtained, where each feature position corresponds to one dominant color, and different feature positions correspond to different dominant colors.

At S130, a target pattern is generated for each feature position, where a color of the target pattern includes a dominant color corresponding to the feature position.

At S140, the target pattern is displayed at the feature position.

At S150, the target pattern is transformed and at least part of a dynamic process of a target pattern transformation is displayed.

According to embodiments of the disclosure, the method may be triggered when a display screen of a terminal device is unlocked, or may be triggered at other occasions, for example, when the terminal device is switched from the application interface to the home screen, or when the terminal device is rotated to change the screen orientation through gravity adaptation, etc.

According to embodiments of the disclosure, the original image may be selected by the user, and the selection of the original image is not limited in embodiments of the disclosure. The dominant colors refer to the primary colors of the original image. The dominant colors of the original image may be extracted and used as the background color of the dynamic wallpaper and the colors of the target patterns. The feature positions correspond to the dominant colors, where each feature position corresponds to one dominant color, and different feature positions correspond to different dominant colors. In some embodiments, color aggregation may be performed on the original image to obtain multiple monochrome regions, where the color of each monochrome region is a dominant color and the position of a gravity center of each monochrome region is a feature position. As such, the dominant colors are in one-to-one correspondence with the feature positions.

According to embodiments of the disclosure, the feature position may be the position of the gravity center, but is not limited to the position of the gravity center. For example, the feature position may be a geometric center or a randomly selected point, etc.

According to embodiments of the disclosure, the quantity of the dominant colors may be one more than the quantity of the feature positions. The dominant colors include one background color, and the dominant colors other than the background color are in one-to-one correspondence with the feature positions. For example, a dominant color corresponding to the largest quantity of pixels may be taken as the background color, and other dominant colors are in one-to-one correspondence with the feature positions.

According to embodiments of the disclosure, the target pattern may be generated at each feature position, and the color of the target pattern is consistent with the dominant color corresponding to the feature position. The shape of the target pattern may be determined through various methods. In some embodiments, the contour of an object at a corresponding position in the original image may be obtained through object recognition as the shape of the target pattern. In other embodiments, the shape of the generated target pattern may be not related to the object in the original image. The shape of the generated target pattern may be a simple geometric graphic or of a preset shape, for example, the target pattern may be of a circular shape, a polygonal shape, or a shape enclosed by irregular closed curves, etc. By displaying the target pattern and at least part of the dynamic process of the target pattern transformation, a dynamic wallpaper may be provided, which improves the user interaction experience.

Figure 2:
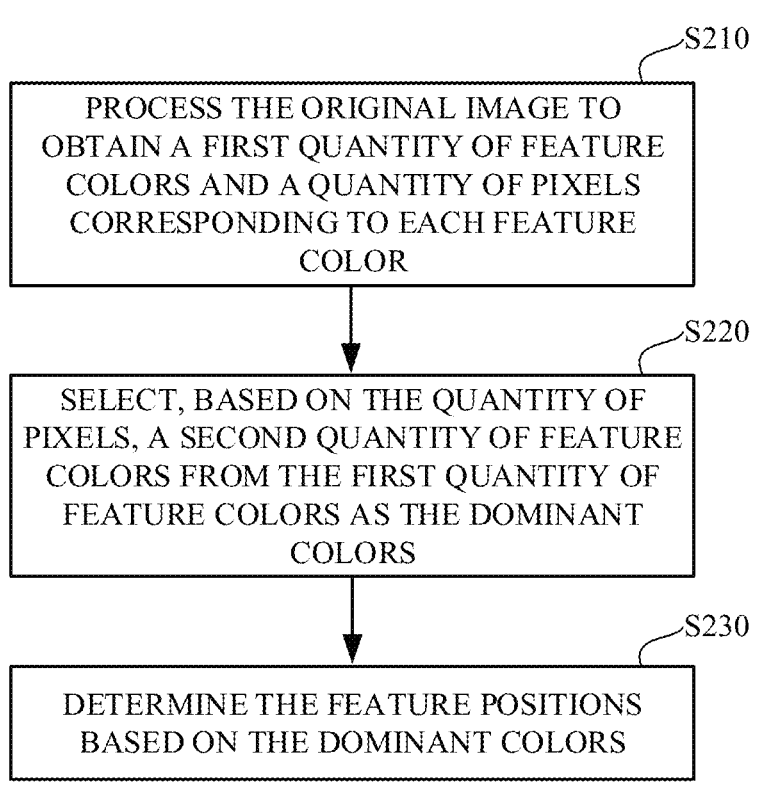
FIG. 2 is a schematic flow chart of obtaining dominant colors and feature positions provided in an embodiment of the disclosure.

FIG. 2 is a schematic flow chart of obtaining dominant colors and feature positions provided in an embodiment of the disclosure.

As illustrated in FIG. 2, the operation at S120 may include operations at S210-S230.

At S210, the original image is processed to obtain a first quantity of feature colors and a quantity of pixels corresponding to each feature color.

At S220, based on the quantity of pixels, a second quantity of feature colors are selected from the first quantity of feature colors as the dominant colors, where the second quantity is less than the first quantity.

At S230, based on the dominant colors, the feature positions are determined.

According to embodiments of the disclosure, the dominant colors of the original image may be extracted using existed algorithms, for example, median cut algorithm may be used to extract the dominant colors of the original image. For the consideration of performance, the median cut algorithm may be used to obtain, for example, 16 feature colors, and then the feature colors are sorted according to the quantities of pixels corresponding to different feature colors. The proportion of each feature color may be obtained by sorting the quantities of pixels in a descending order, and 6 feature colors with the highest proportion among the 16 feature colors are selected as the dominant colors of the original image. Out of the 6 feature colors, the feature color with the highest proportion may be taken as the background color. By using the method described above, the chance of losing important colors may be reduced compared to directly extracting the second quantity of colors.

According to embodiments of the disclosure, after the dominant colors of the original image are obtained, the positions of pixels corresponding to the dominant colors in the image need to be obtained. A coordinate of each of the positions may serve as the gravity center of the target pattern to be generated.

According to embodiments of the disclosure, based on the dominant colors, the feature positions are determined as follows. Each pixel of the original image is traversed, and a position of a pixel emitting the dominant color that appears for the first time is determined as a feature position, or a position of a pixel emitting a color with greatest similarity with the dominant color that appears for the first time is determined as a feature position.

In an embodiment, the length and the width of the original image may be obtained first, where the length serves as the X-axis and the width serves as the Y-axis. The coordinate of each pixel is obtained by cyclically traversing the X-axis and the Y-axis, and the color corresponding to each pixel is obtained and compared with each dominant color. The position of the pixel emitting the dominant color that appears for the first time is the feature position corresponding to the dominant color. In this way, the calculation may be simplified and the processing efficiency may be improved. When using a dominant color extraction algorithm, in some cases, the dominant color may be obtained by averaging the color parameters, and a pixel in the original image emitting the color that is the same with the dominant color may not always exist. In this case, the similarity between each pixel and the dominant color may be calculated, and a position of a pixel emitting a color with greatest similarity with the dominant color that appears for the first time is determined as the feature position corresponding to the dominant color. In this case, a pixel emitting a color with greatest similarity with the dominant color may be recorded during traversal. If a new pixel emitting a color which is more similar to the dominant color, the coordinate of the new pixel will be recorded, otherwise the coordinate of the new pixel will be discarded. The process will be repeated until the coordinates of pixels each emitting a color with greatest similarity with one dominant color are obtained.

According to embodiments of the disclosure, in order to compare the similarity between two colors, colors need to be quantified at first. Since the RGB (Red, Green, Blue) color space is a linear and orthogonal coordinate system, while the human visual system is not linear, the RGB color space is unable to reflect the perception of colors by human eye, and a corresponding color distance is unable to well reflect the similarity between two colors. The LAB color space is based on the perception of colors by human eye and can represent all colors perceptible by human eye. The value L represents brightness, the value A represents color difference between red and green, and the value B represents color difference between blue and yellow. Therefore, colors may be converted to the LAB color space first, and then a Euclidean distance between two colors is calculated. That is, $\Delta E = \sqrt{\Delta L^2 + \Delta^2 + \Delta^2}$, where $\Delta L$, $\Delta$, $\Delta B$ respectively represent the differences between the two colors in terms of different values, and $\Delta E$ represents color difference, that is, the similarity of colors. A smaller $\Delta E$ represents a greater similarity between the two colors.

Figure 3:
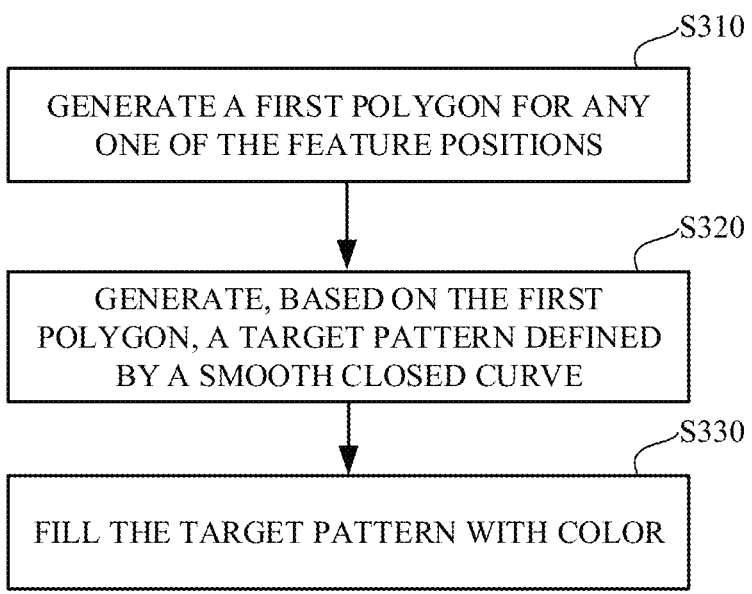
FIG. 3 is a schematic flow chart of generating a target pattern provided in an embodiment of the disclosure.

FIG. 3 is a schematic flow chart of generating a target pattern provided in an embodiment of the disclosure.

As illustrated in FIG. 3, the operation at S130 may include operations at S310-S330. That is, FIG. 3 may be a sub-flowchart of the operation at S130.

At S310, a first polygon is generated for any one of the feature positions.

At S320, based on the first polygon, a target pattern defined by a smooth closed curve is generated.

At S330, the target pattern is filled with color.

According to embodiments of the disclosure, the first polygons generated at different feature positions may be the same, or may be different. By generating different first polygons, irregularity of the movement effect may be increased, thereby improving the interaction experience. After the first polygon is generated, a target pattern defined by a smooth closed curve may be generated according to the first polygon. As such, a static image may be abstracted into multiple closed curves, thereby rendering a gentler movement effect of a pattern defined by the closed curves.

According to embodiments of the disclosure, the target pattern may be drawn on the display screen after being generated, and the target pattern is filled with color. Comparing to drawing the pattern based on the first polygon, the technical solution of the embodiment of the disclosure can provide a smoother and gentler initial image, avoiding unpleasant experience brought to the users due to edges and corners of the polygon.

Figures 4, 5:
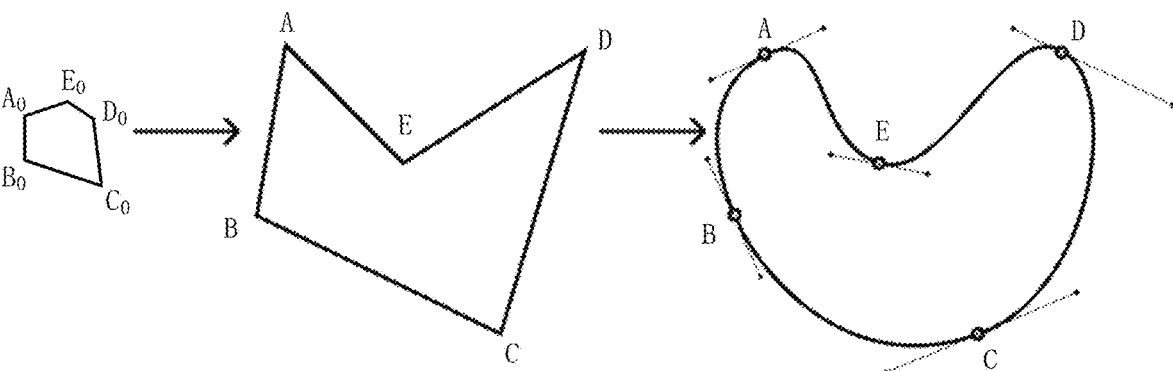
FIG. 4 is a schematic flow chart of generating a first polygon provided in an embodiment of the disclosure.
FIG. 5 is a schematic view of generating a target pattern provided in an embodiment of the disclosure.

FIG. 4 is a schematic flow chart of generating a first polygon provided in an embodiment of the disclosure.

As illustrated in FIG. 4, the operation at S310 may include operations at S410 and S420. That is, FIG. 4 is a sub-flowchart of the operation at S310.

At S410, a second polygon is generated for any one of the feature positions.

At S420, each vertex of the second polygon is randomly moved for a distance in a feature direction of the vertex to obtain the first polygon, where the feature direction of the vertex comprises a direction from a feature point of the second polygon to the vertex.

According to embodiments of the disclosure, second polygons generated at different feature positions may be the same, or may be different. Based on the same or different second polygons, different first polygons may be generated. For example, the second polygons at different feature positions may be the same pentagon. The pentagon may be obtained by drawing three triangles ($A_0$, $B_0$, $E_0$), ($B_0$, $C_0$, $E_0$), ($C_0$, $D_0$, $E_0$) through OPENGL. As illustrated in FIG. 5, a pentagon $A_0B_0C_0D_0E_0$ may be transformed into a random first polygon ABCDE, and then a target pattern defined by a smooth closed curve may be generated based on the first polygon ABCDE.

According to embodiments of the disclosure, the first polygon may be obtained by moving vertices of the second polygon in feature directions of the vertices of the second polygon. As illustrated in FIG. 5, the second polygon is a small pentagon $A_0B_0C_0D_0E_0$, and a coordinate system may be established with the coordinate of the gravity center of the pentagon as the origin, and thus coordinates of other positions are determined. The feature direction may be a direction from the gravity center to each vertex, and each vertex can move outward in a line connecting the gravity center and the vertex. Feature points may be the same or different from the feature positions. The feature points may be, but are not limited to gravity centers, and the feature points may be geometric centers or random positions, etc. The movement speed may be a random number between 1-10, with a unit of pixels per frame, that is, moving outward for 1-10 pixels per frame. To avoid excessively sharp angles, the range of movement speed may be further reduced, for example, 2-6 pixels per frame may be taken. Due to different movement speeds of each vertex, the shape of the obtained pentagon ABCDE is random. In other embodiments, the movement speed is randomly determined, and the value of the movement speed may be a positive number, a negative number, or zero. When the movement speed is zero, the position of the vertex remains unchanged. When the moving speed is a positive number, the vertex moves away from the pattern. When the movement speed is a negative number, the vertex moves towards the interior of the pattern.

Figure 6:
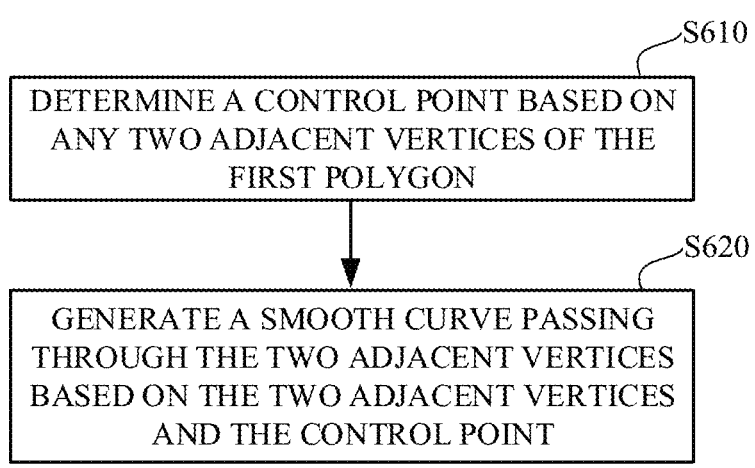
FIG. 6 is a schematic flow chart of generating a target pattern provided in another embodiment of the disclosure.

FIG. 6 is a schematic flow chart of generating a target pattern provided in another embodiment of the disclosure.

As illustrated in FIG. 6, the operation at S320 may include operations at S610 and S620. That is, FIG. 6 is a sub-flowchart of the operation at S320.

At S610, a control point is determined based on any two adjacent vertices of the first polygon.

At S620, a smooth curve passing through the two adjacent vertices is generated based on the two adjacent vertices and the control point, where the target pattern is defined by multiple smooth curves.

Figure 7:
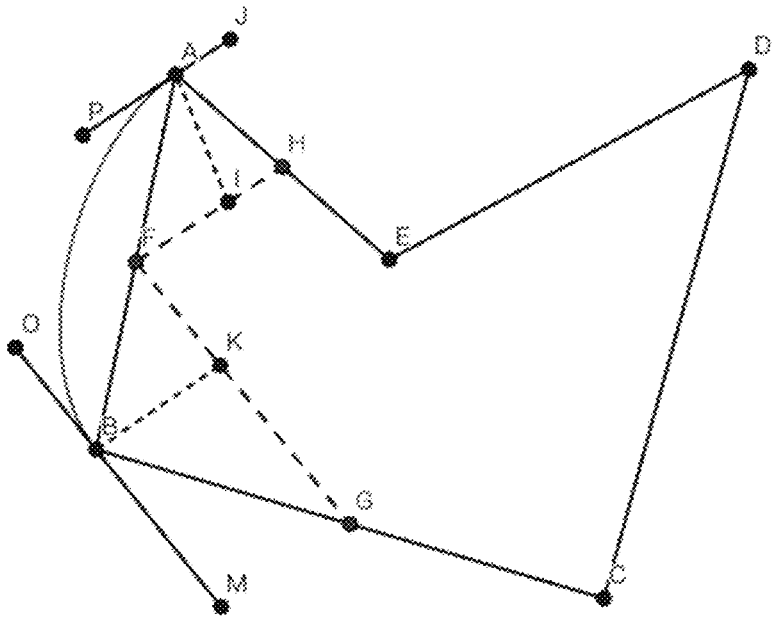
FIG. 7 is a schematic view of determining a control point provided in an embodiment of the disclosure.

According to embodiments of the disclosure, the control point is a point controlling the curve during the process of drawing smooth curve, and the position of the control point affects the shape of the generated curve. As illustrated in FIG. 7, two adjacent vertices A and B are taken for example, and two control points O and P are generated. A smooth curve AB is drawn based on four points, namely A, P, O, B. The quantity of control points between two adjacent vertices is not limited to two. The quantity of control points may be one or more than three.

According to embodiments of the disclosure, in a case where there are two control points, a third-order Bezier curve passing through two vertices may be generated, which is $B(t)=P_0(1-t)^3+3P_1t(1-t)^2+3P_2t^2(1-t)+P_3t^3$, where $P_0$ and $P_3$ are coordinates of the two vertices, and $P_1$ and $P_2$ are coordinates of the two control points.

According to embodiments of the disclosure, any two adjacent vertices of the first polygon include a first vertex and a second vertex. The control point is determined based on any two adjacent vertices of the first polygon as follows. The control point is determined based on a first connection line segment and a second connection line segment, where the first connection line segment is a line segment connecting two middle points of two adjacent sides that pass through the first vertex, and the second connection line segment is a line segment connecting two middle points of two adjacent sides that pass through the second vertex.

As illustrated in FIG. 7, the first vertex and the second vertex may be vertex A and vertex B respectively. Two adjacent sides passing through the first vertex A are AB and AE, and middle points are F and H respectively. The first connection line segment is a line segment FH connecting F and H. Similarly, two adjacent sides passing through the second vertex B are AB and BC, and middle points are F and G respectively. The second connection line segment is a line segment FG connecting F and G. Control points P and O may be determined based on the first connection line segment FH and the second connection line segment FG.

According to embodiments of the disclosure, the control point is determined based on the first connection line segment and the second connection line segment as follows. A first control point is determined based on the first vertex and the first connection line segment, where a third connection line segment connecting the first vertex and the first control point is parallel to the first connection line segment. A second control point is determined based on the second vertex and the second connection line segment, where a fourth connection line segment connecting the second vertex and the second control point is parallel to the second connection line segment.

Reference is again made to FIG. 7. A first control point P selected satisfies the following condition: a third connection line segment AP connecting the first vertex A and the first control point P is parallel to the first connection line segment FH. When selecting a control point J between AJ, AJ is ensured to be parallel to the first connection line segment FH, which makes PJ a line segment passing through the vertex A. The first control point P and the control point J control the curves on both sides of the first vertex A to be smooth at the position of the vertex A, which helps to present a smooth effect of the whole target pattern. The second control point is similar to the first control point, which will not be repeated herein.

According to embodiments of the disclosure, the image display method further includes the following. A distance from the first control point to the first vertex is determined based on a ratio of lengths of two adjacent sides that pass through the first vertex. A distance from the second control point to the second vertex is determined based on a ratio of lengths of two adjacent sides that pass through the second vertex.

Reference is again made to FIG. 7. A ratio of the lengths of the two adjacent sides AB and AE that pass through the first vertex A is consistent with a ratio of the lengths of the line segments AF and AH. Therefore, point I may be selected on FH, such that AF: AH=FI: IH, and then point F may be moved along a vector $\overrightarrow{AI}$ to obtain the first control point P. Similarly, point K may be selected on FG, such that BF: BG=FK: KG, and then the point F may be moved along a vector $\overrightarrow{KB}$ to obtain the second control point O.

Figure 8:
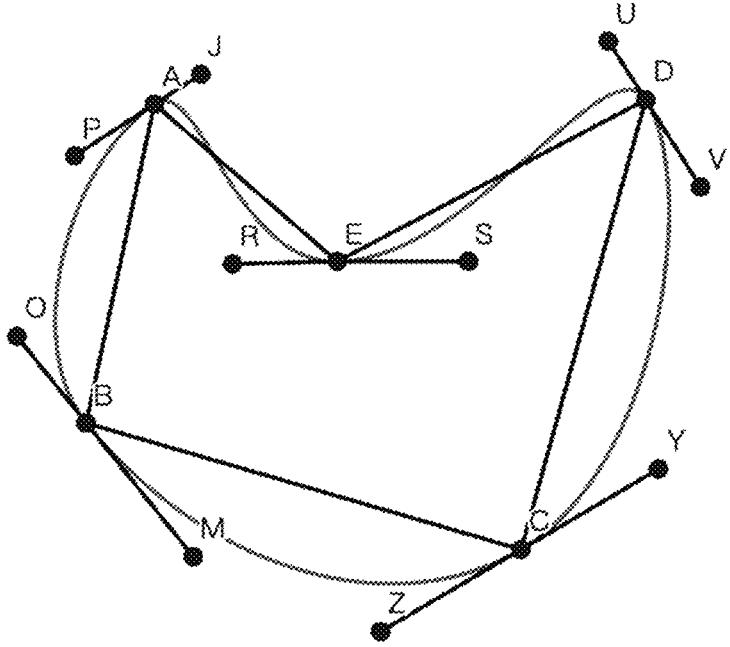
FIG. 8 is a schematic view of generating a target pattern provided in an embodiment of the disclosure.

According to embodiments of the disclosure, deformation parameters may be further set, and the shape of the target pattern may be changed by altering the position of control points. As illustrated in FIG. 7, the position of the first control point P may be determined using the method described above. A distance coefficient of a distance PA may be changed, so that the first control point P moves along a line where the line PA is located. When the control point P approaches the vertex A and the control point O approaches the vertex B, the curve will gradually become a straight line. When the control point P moves away from the vertex A and the control point O moves away from the vertex B, the curve will become increasingly steeper. According to the above method, five curves may be drawn as illustrated in FIG. 8. Since the shape of the pentagon is random, the shapes of the generated curves are also random. In FIG. 8, the control point P and the control point O are determined between the vertex A and the vertex B, a control point M and a control point Z are determined between the vertex B and a vertex C, a control point Y and a control point V are determined between the vertex C and a vertex D, a control point U and a control point S are determined between the vertex D and a vertex E, and a control point R and a control point J are determined between the vertex E and the vertex A. According to the embodiment of the disclosure, the vertex A and the control points P and J determined based on the vertex A are collinear, the vertex B and the control points O and M determined based on the vertex B are collinear, the vertex C and the control points Z and Y determined based on the vertex C are collinear, the vertex D and the control points V and U determined based on the vertex D are collinear, and the vertex E and the control points S and R determined based on the vertex E are collinear.

Figure 9:
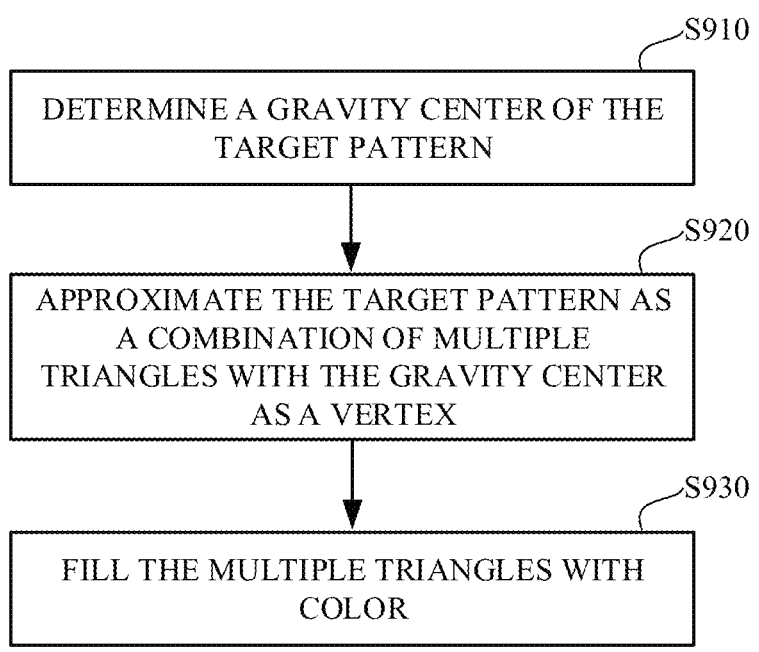
FIG. 9 is a schematic flow chart of filling the target pattern with color provided in an embodiment of the disclosure.

FIG. 9 is a schematic flow chart of filling the target pattern with color provided in an embodiment of the disclosure.

As illustrated in FIG. 9, the operation at S330 may include operations at S910-S930. That is, FIG. 9 is a sub-flowchart of the operation at S330.

At S910, a gravity center of the target pattern is determined.

At S920, the target pattern is approximated as a combination of multiple triangles with the gravity center as a vertex.

At S930, the multiple triangles are filled with color.

According to embodiments of the disclosure, the target pattern may be colored by a fragment shader, so that the target pattern displays a dominant color corresponding to a feature position where the target pattern is located. However, for the fragment shader, coloring an irregular target pattern may be complicated. By using the method provided in embodiments of the disclosure, the target pattern is divided into multiple triangles, which is easy for the fragment shader to color.

Figure 10:
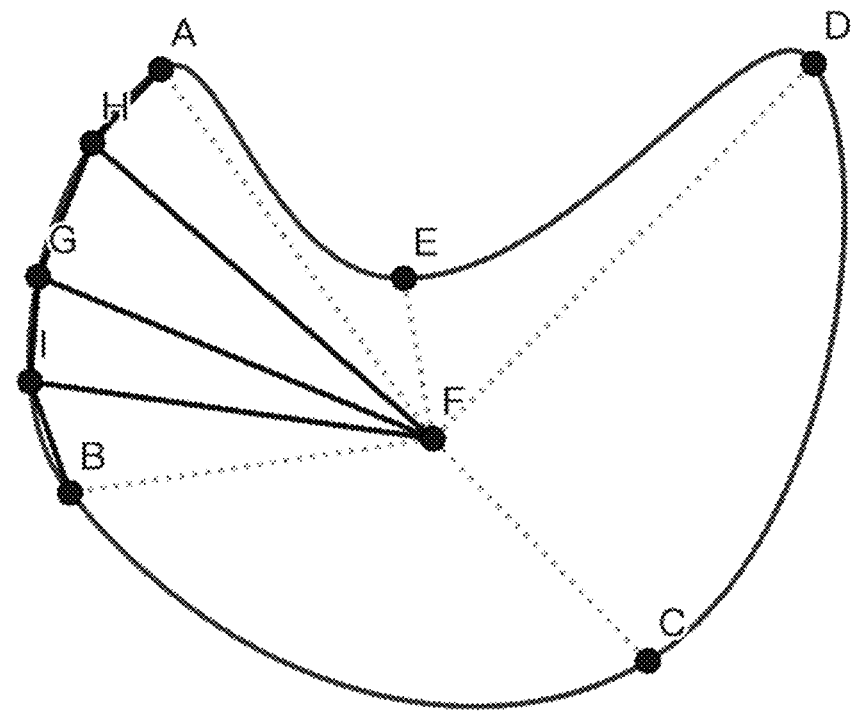
FIG. 10 is a schematic view of approximating the target pattern as a combination of multiple triangles provided in an embodiment of the disclosure.

For example, as illustrated in FIG. 10, based on a gravity center F of a target pattern, the target pattern may be divided into multiple sub-patterns FAB, FBC, FCD, FDE, and FEA. A curve of each sub-pattern is then divided into multiple segments, and the multiple segments approximate to a curve segment. For example, the curve may be repeatedly divided into two halves according to the length, to obtain small segments with the quantity of $2^n$. In order to strike a balance between maintaining a good effect and not impacting the performance, the curve of each sub-pattern may be divided into 64 small segments. For clear illustration, the curve is divided into two halves two times in FIG. 10, where 4 small segments are AH, HG, GI, and IB. As illustrated in FIG. 10, each small segment forms a triangle with the gravity center F, making it easy for the fragment shader to color. Similar processing methods may be performed on other sub-patterns.

According to embodiments of the disclosure, the target pattern is transformed and at least part of a dynamic process of a target pattern transformation is displayed as follows. The target pattern is made to perform a rotation movement and a translation movement within a preset duration to generate a dynamic effect. The preset duration may be, for example, 1 second, 2 seconds, or 3 seconds. The preset duration is also allowed to be adjusted by the users. The rotation movement and the translation movement may be performed simultaneously. By making the target pattern perform the rotation movement and the translation movement within the preset duration, a better visual effect may be presented.

According to embodiments of the disclosure, the position of the gravity center of the target pattern may serve as a center of rotation, and the angle of rotation may be a specific angle or a random angle. For example, the target pattern may be rotated by 90 degrees, 180 degrees, 270 degrees, 360 degrees, 720 degrees, or a random angle within the preset duration. Within a fixed duration, a larger angle of rotation corresponds to a greater angular velocity of rotation. In a case where the preset duration is 3 seconds, 60 frames are drawn per second, and the angle of rotation is 360 degrees, the angle of rotation per frame is calculated as: 360 degrees/(60 frames/second*3 seconds)=2 degrees/frame.

According to embodiments of the disclosure, the translational movement may be measured through a distance the gravity center moves. The translation movement may be performed based on a preset translation vector or a random translation vector, or based on a preset final position or a random final position. For example, in some embodiments, the gravity center of the target pattern may be translated to a random position. A translation vector may be determined based on the random position, and the translation movement may be performed based on the translation vector. Within a fixed duration, a greater distance of translation corresponds to a faster movement. In a case where the preset duration is 3 seconds, 60 frames are drawn per second, and the translation distance is 720 unit distances, the distance moved per frame is calculated as: 720/(60 frames/second*3 seconds)=4 unit distances. Since the final position of each movement is random, the effect of each animation is different, which can further enhance the user interaction experience.

According to embodiments of the disclosure, before the target pattern is displayed at the feature position, the method further includes the following. A blur processing layer is added to perform a blur processing on a display process and a transformation process of the target pattern. For example, a weighted sum of adjacent pixels is used to mix the color of a current pixel, and a blurring effect may be achieved. By adding the blurring effect, details of the wallpaper may be blurred, making icons and widgets on the home screen become the focus. Meanwhile, details of dynamic changes may be blurred, allowing for a higher tolerance for dynamic changes and making dynamic changes more comfortable in terms of visual experience.

According to embodiments of the disclosure, the blur processing layer may include a Gaussian blur layer and a noise layer. The Gaussian blur layer uses a two-dimensional Gaussian function to calculate the weights of the adjacent pixels, while the noise layer adds texture to the Gaussian blur layer to produce a snowflake effect similar to the static noise in television, which can further obscure the details. For example, the noise layer may be implemented through a random function in OPENGL.

According to embodiments of the disclosure, for a terminal device performing the above method, a light strip is disposed on one side of the terminal device opposite to a display screen (for example, the back of a cell phone). When a dynamic wallpaper is displayed, the light strip is configured to display a preset or random light effect with the movement of the dynamic wallpaper. For example, the light effect may be a rotation effect similar to the rotation of the target pattern, which can further improve the user experience and perform a reminder function.

Based on the same inventive concept, embodiments of the disclosure further provide an image display apparatus. The image display apparatus provided in embodiments of the disclosure will be described with reference to FIG. 11 in the following.

Figure 11:
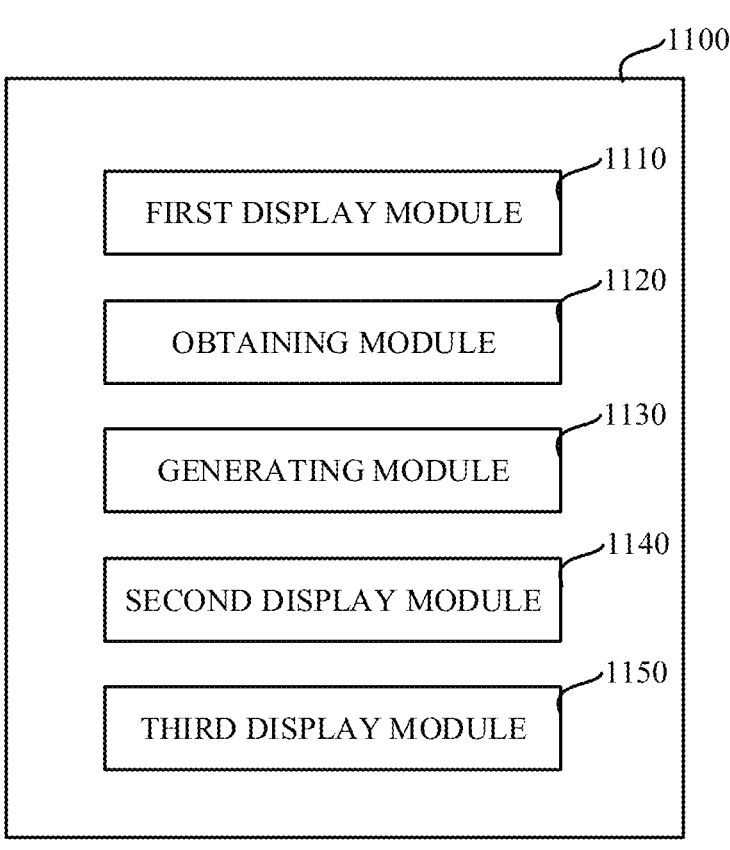
FIG. 11 is a schematic block diagram of an image display apparatus provided in an embodiment of the disclosure.

FIG. 11 is a schematic block diagram of an image display apparatus 1100 provided in an embodiment of the disclosure. The apparatus 1100 may be implemented through software, hardware or a combination thereof to form a part or all of an electronic device.

As illustrated in FIG. 11, the image display apparatus 1100 includes a first display module 1110, an obtaining module 1120, a generating module 1130, a second display module 1140, and a third display module 1150. The image display apparatus 1100 can execute various methods described above.

The first display module 1110 is configured to display an original image.

The obtaining module 1120 is configured to obtain dominant colors and feature positions of the original image, where each feature position corresponds to one dominant color, and different feature positions correspond to different dominant colors.

The generating module 1130 is configured to generate a target pattern for each feature position, where a color of the target pattern includes a dominant color corresponding to the feature position.

The second display module 1140 is configured to display the target pattern at the feature position.

The third display module 1150 is configured to transform the target pattern, and display at least part of a dynamic process of a target pattern transformation.

Figure 12:
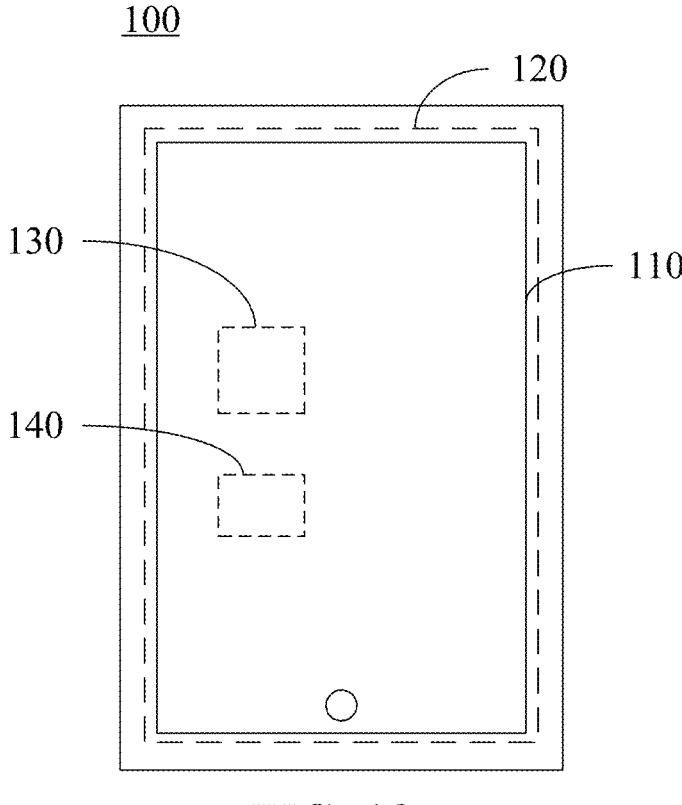
FIG. 12 is a schematic structural view of an electronic device provided in an embodiment of the disclosure.

As illustrated in FIG. 12, which is a schematic structural view of an electronic device provided in an embodiment of the disclosure. Embodiments of the disclosure further provide an electronic device 100. The electronic device 100 includes a display screen 110, at least one processor 130, and a memory 140 communicated with the at least one processor 130. The memory 140 stores an instruction executable by the at least one processor 130, and the instruction, when executed by the at least one processor 130, causes the at least one processor 130 to drive the display screen 110 to perform the image display methods described above.

According to embodiments of the disclosure, the electronic device 100 further includes a light strip 120. The light strip 120 is disposed on one side of the electronic device 100 opposite to the display screen 110, and the light strip 120 is configured to display a preset or random light effect when the display screen 110 displays at least part of a dynamic process of target pattern transformation.

Figure 13:
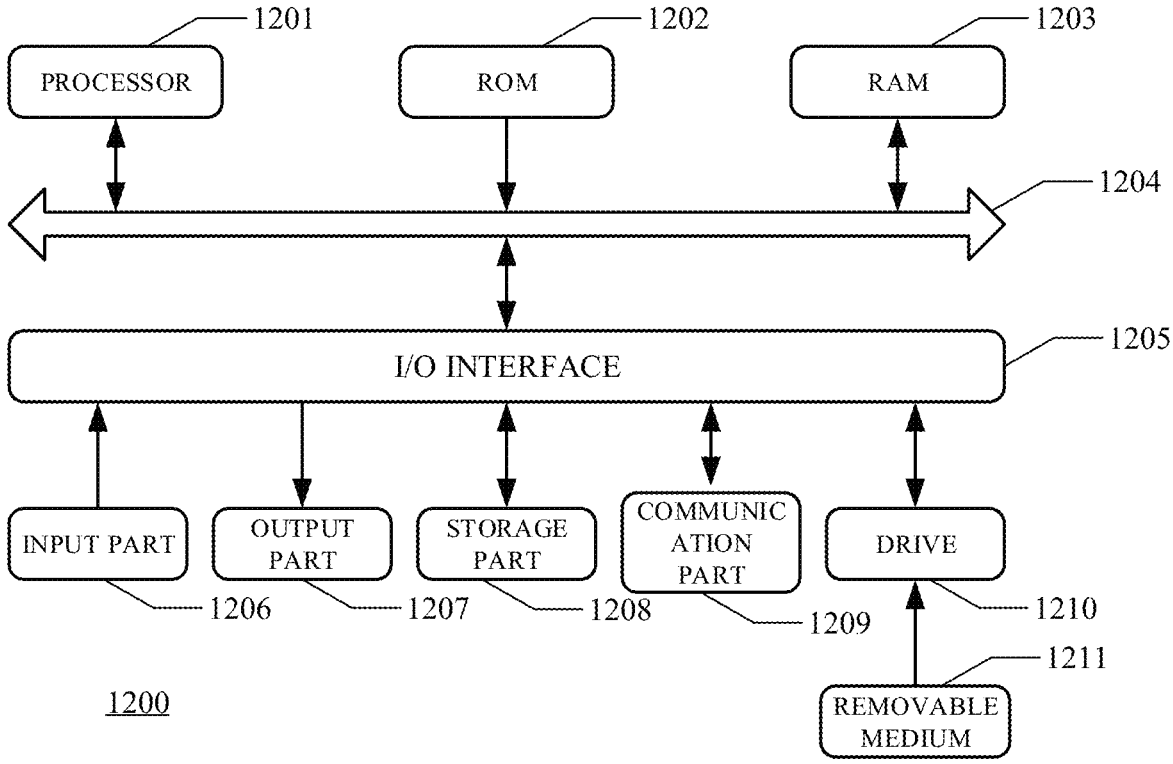
FIG. 13 is a schematic structural view of a computer system adapted to implement an image display method and apparatus provided in an embodiment of the disclosure.

FIG. 13 is a schematic structural view of a computer system adapted to implement an image display method and apparatus provided in an embodiment of the disclosure.

As illustrated in FIG. 13, a computer system 1200 includes a processor 1201, which can execute various processes in the above embodiments according to a program stored in a read-only memory (ROM) 1202 or a program loaded from a storage part 1208 into a random access memory (RAM) 1203. Various programs and data required for the operation of the system 1200 are also stored in the RAM 1203. The processor 1201, the ROM 1202, and the RAM 1203 are connected to each other through a bus 1204. An input/output (I/O) interface 1205 is also connected to the bus 1204.

The following components are connected to the I/O interface 1205: an input part 1206 including a keyboard, a mouse and the like; an output part 1207 including a cathode ray tube (CRT), a liquid crystal display (LCD), a speaker and the like; a storage part 1208 including a hard disk and the like; and a communication part 1209 including a network interface card such as a LAN card, a modem and the like. The communication part 1209 performs communication processing via a network such as the Internet. A drive 1210 is also connected to the I/O interface 1205 as required. A removable medium 1211, such as a magnetic disk, an optical disk, a magneto-optical disk, a semiconductor memory or the like, is installed on the drive 1210 as required, so that the computer program read from it is installed into the storage part 1208 as required. The processor 1201 may be implemented as processing units such as CPU, GPU, TPU, FPGA, NPU, and the like.

In particular, according to the embodiment of the disclosure, the methods described above can be implemented as a computer software program. For example, the embodiment of the disclosure includes a computer program product, which includes a computer program carried on a computer-readable medium, and the computer program contains a program code for executing the methods described above. In such an embodiment, the computer program may be downloaded and installed from the network through the communication part 1209, and/or installed from the removable medium 1211.

The flow charts and block diagrams in the accompanying drawings illustrate possible system architectures, functions and operations of the system, method and computer program product according to various embodiments of the disclosure. In this regard, each block in the flow charts or block diagrams can represent a unit, a program segment, or a part of a code, which contains one or more executable instructions for realizing the specified logic function. It may also be noted that, in some alternative implementations, the functions marked in the blocks may also occur in a different order from that marked in the drawings. For example, two blocks shown in succession can actually be executed substantially in parallel, and they can sometimes be executed in a reverse order, depending on the functions involved. It may further be noted that each block in the block diagrams or flow charts, and the combination of blocks in the block diagrams or flow charts can be implemented by a dedicated hardware-based system that performs the specified functions or operations, or can be implemented by a combination of dedicated hardware and computer instructions.

The units involved in the embodiments described in the disclosure can be implemented by software or programmable hardware. The described units or modules can also be provided in a processor, and the names of these units or modules do not constitute limitations to the units or modules themselves under certain circumstances.

In another aspect, the present disclosure also provides a computer-readable medium, which may be included in the electronic device or the computer system described in the above embodiment or may exist alone without being assembled into the device. The above computer-readable medium carries one or more programs which, when executed by one or more than one processors, cause the one or more than one processors to execute the methods provided in embodiments of the disclosure.

The foregoing description is only exemplary of the preferred embodiments of the present disclosure and is illustrative of the principles of the technology employed. It may be understood by those skilled in the art that the scope of the disclosure in the present disclosure is not limited to the technical solutions formed by specific combination of the above-mentioned features, but also encompasses other technical solutions formed by any combination of the above-mentioned features or their equivalent features without departing from the inventive concept, for example, technical solutions formed by interchanging the above features and the technical features disclosed in the present disclosure (but not limited $t_0$) having similar functions.

According to embodiments of the disclosure, the dominant colors and the feature positions of the original image are obtained as follows. The original image is processed to obtain a first quantity of feature colors and a quantity of pixels corresponding to each feature color. Based on the quantity of pixels, a second quantity of feature colors is selected from the first quantity of feature colors as the dominant colors, where the second quantity is less than the first quantity. Based on the dominant colors, the feature positions are determined.

According to embodiments of the disclosure, based on the dominant colors, the feature positions are determined as follows. Each pixel of the original image is traversed, and a position of a pixel emitting the dominant color that appears for the first time is determined as a feature position, or a position of a pixel emitting a color with greatest similarity with the dominant color that appears for the first time is determined as a feature position.

According to embodiments of the disclosure, a quantity of the dominant colors is one more than a quantity of the feature positions, the dominant colors include one background color, and dominant colors other than the background color are in one-to-one correspondence with the feature positions.

According to embodiments of the disclosure, the target pattern is generated for each feature position as follows. A first polygon is generated for any one of the feature positions. Based on the first polygon, a target pattern defined by a smooth closed curve is generated. The target pattern is filled with color.

According to embodiments of the disclosure, the first polygon is generated for any one of the feature positions as follows. A second polygon is generated for any one of the feature positions. Each vertex of the second polygon is randomly moved for a distance in a feature direction of the vertex to obtain the first polygon, where the feature direction of the vertex comprises a direction from a feature point of the second polygon to the vertex.

According to embodiments of the disclosure, based on the first polygon, the target pattern defined by the smooth closed curve is generated as follows. A control point is determined based on any two adjacent vertices of the first polygon. A smooth curve passing through the two adjacent vertices is generated based on the two adjacent vertices and the control point, where the target pattern is defined by multiple smooth curves.

According to embodiments of the disclosure, any two adjacent vertices of the first polygon include a first vertex and a second vertex. The control point is determined based on any two adjacent vertices of the first polygon as follows. The control point is determined based on a first connection line segment and a second connection line segment, where the first connection line segment is a line segment connecting two middle points of two adjacent sides that pass through the first vertex, and the second connection line segment is a line segment connecting two middle points of two adjacent sides that pass through the second vertex.

According to embodiments of the disclosure, the control point is determined based on a first connection line segment and a second connection line segment as follows. A first control point is determined based on the first vertex and the first connection line segment, where a third connection line segment connecting the first vertex and the first control point is parallel to the first connection line segment. A second control point is determined based on the second vertex and the second connection line segment, where a fourth connection line segment connecting the second vertex and the second control point is parallel to the second connection line segment.

According to embodiments of the disclosure, the image display method further includes the following. A distance from the first control point to the first vertex is determined based on a ratio of lengths of two adjacent sides that pass through the first vertex. A distance from the second control point to the second vertex is determined based on a ratio of lengths of two adjacent sides that pass through the second vertex.

According to embodiments of the disclosure, the target pattern is filled with color as follows. A gravity center of the target pattern is determined. The target pattern is approximated as a combination of multiple triangles with the gravity center as a vertex. The multiple triangles are filled with color.

According to embodiments of the disclosure, the target pattern is transformed and at least part of a dynamic process of a target pattern transformation is displayed as follows.

The target pattern is made to perform a rotation movement and a translation movement within a preset duration to generate a dynamic effect.

According to embodiments of the disclosure, the gravity center of the target pattern is translated to a random position, and the target pattern is rotated by a fixed angle or a random angle.

According to embodiments of the disclosure, before the target pattern is displayed at the feature position, the method further includes the following. A blur processing layer is added to perform a blur processing on a display process and a transformation process of the target pattern, where the blur processing layer includes a Gaussian blur layer and a noise layer.

According to embodiments of the disclosure, the electronic device further includes a light strip. The light strip is disposed on one side of the electronic device opposite to the display screen, and the light strip is configured to display a preset or random light effect when the display screen displays at least part of a dynamic process of target pattern transformation.

In another aspect of embodiments of the disclosure, a non-transitory computer readable storage medium is provided. The non-transitory computer readable storage medium stores a computer readable instruction which, when executed by a processor, causes the processor to execute the methods described above.

In another aspect of embodiments of the disclosure, a computer program is provided. The computer program, when executed by a processor, causes the processor to execute the methods described above.

According to the technical solution of embodiments of the disclosure, through technical processing on images, a static image can be processed into a dynamic image, and dynamic effects are displayed to provide a dynamic wallpaper. In the disclosure, dominant colors of an image are extracted and target patterns are generated at feature positions, so that the color of background and the colors of target patterns on the dynamic wallpaper are taken from the original image, thereby making the conversion process relatively natural. It is verified that images that are not monochromatic can create a better dynamic effect, which improves the user interaction experience.

What is claimed is:

1. An image display method, comprising:
   displaying an original image;
   obtaining dominant colors and feature positions of the original image, wherein each feature position corresponds to one dominant color, and different feature positions correspond to different dominant colors;
   generating a target pattern for each feature position, wherein a color of the target pattern comprises a dominant color corresponding to the feature position;
   displaying the target pattern at the feature position; and
   transforming the target pattern, and displaying at least part of a dynamic process of a target pattern transformation;
   wherein obtaining the dominant colors and the feature positions of the original image comprises:
   processing the original image to obtain a first quantity of feature colors and a quantity of pixels corresponding to each feature color;
   selecting, based on the quantity of pixels, a second quantity of feature colors from the first quantity of feature colors as the dominant colors, wherein the second quantity is less than the first quantity; and
   determining the feature positions based on the dominant colors.

2. The method of claim 1, wherein determining the feature positions based on the dominant colors comprises:

traversing each pixel of the original image, and determining a position of a pixel emitting the dominant color that appears for the first time as a feature position.

3. The method of claim 1, wherein determining the feature positions based on the dominant colors comprises:

traversing each pixel of the original image, and determining a position of a pixel emitting a color with greatest similarity with the dominant color that appears for the first time as a feature position.

4. The method of claim 1, wherein a quantity of the dominant colors is one more than a quantity of the feature positions, the dominant colors comprise one background color, and dominant colors other than the background color are in one-to-one correspondence with the feature positions.

5. The method of claim 1, wherein generating the target pattern for each feature position comprises:

generating a first polygon for any one of the feature positions;

generating, based on the first polygon, a target pattern defined by a smooth closed curve; and filling the target pattern with color.

6. The method of claim 5, wherein generating the first polygon for any one of the feature positions comprises:

generating a second polygon for any one of the feature positions; and randomly moving each vertex of the second polygon for a distance in a feature direction of the vertex, to obtain the first polygon, wherein the feature direction of the vertex comprises a direction from a feature point of the second polygon to the vertex.

7. The method of claim 5, wherein generating, based on the first polygon, the target pattern defined by the smooth closed curve comprises:

determining a control point based on any two adjacent vertices of the first polygon; and generating a smooth curve passing through the two adjacent vertices based on the two adjacent vertices and the control point, wherein the target pattern is defined by a plurality of smooth curves.

8. The method of claim 7, wherein any two adjacent vertices of the first polygon comprise a first vertex and a second vertex, and determining the control point based on any two adjacent vertices of the first polygon comprises:

determining the control point based on a first connection line segment and a second connection line segment, wherein the first connection line segment is a line segment connecting two middle points of two adjacent sides that pass through the first vertex, and the second connection line segment is a line segment connecting two middle points of two adjacent sides that pass through the second vertex.

9. The method of claim 8, wherein determining the control point based on the first connection line segment and the second connection line segment comprises:

determining a first control point based on the first vertex and the first connection line segment, wherein a third connection line segment connecting the first vertex and the first control point is parallel to the first connection line segment; and determining a second control point based on the second vertex and the second connection line segment, wherein a fourth connection line segment connecting the second vertex and the second control point is parallel to the second connection line segment.

10. The method of claim 9, further comprising:

determining a distance from the first control point to the first vertex based on a ratio of lengths of two adjacent sides that pass through the first vertex; and determining a distance from the second control point to the second vertex based on a ratio of lengths of two adjacent sides that pass through the second vertex.

11. The method of claim 5, wherein filling the target pattern with color comprises:

determining a gravity center of the target pattern;

approximating the target pattern as a combination of a plurality of triangles with the gravity center as a vertex; and filling the plurality of triangles with color.

12. The method of claim 1, wherein transforming the target pattern, and displaying at least part of the dynamic process of the target pattern transformation comprises:

making the target pattern perform a rotation movement and a translation movement within a preset duration, to generate a dynamic effect.

13. The method of claim 12, wherein the gravity center of the target pattern is translated to a random position, and the target pattern is rotated by a fixed angle or a random angle.

14. The method of claim 1, wherein before displaying the target pattern at the feature position, the method further comprises:

adding a blur processing layer to perform a blur processing on a display process and a transformation process of the target pattern, wherein the blur processing layer comprises a Gaussian blur layer and a noise layer.

15. An electronic device, comprising:

a display screen;

at least one processor; and a memory communicated with the at least one processor; wherein the memory stores an instruction executable by the at least one processor, and the instruction, when executed by the at least one processor, causes the at least one processor to drive the electronic device to:

display an original image;

obtain dominant colors and feature positions of the original image, wherein each feature position corresponds to one dominant color, and different feature positions correspond to different dominant colors;

generate a target pattern for each feature position, wherein a color of the target pattern comprises a dominant color corresponding to the feature position;

display the target pattern at the feature position; and transform the target pattern, and display at least part of a dynamic process of a target pattern transformation;

wherein in terms of obtaining the dominant colors and the feature positions of the original image, the instruction, when executed by the at least one processor, causes the at least one processor to drive the electronic device to:

process the original image to obtain a first quantity of feature colors and a quantity of pixels corresponding to each feature color;

select, based on the quantity of pixels, a second quantity of feature colors from the first quantity of feature colors as the dominant colors, wherein the second quantity is less than the first quantity; and determine the feature positions based on the dominant colors.

16. The electronic device of claim 15, further comprising:

a light strip, wherein the light strip is disposed on one side of the electronic device opposite to the display screen, and the light strip is configured to display a preset or random light effect when the display screen displays at least part of a dynamic process of target pattern transformation.

17. A non-transitory computer readable storage medium, wherein the non-transitory computer readable storage medium stores a computer readable instruction which, when executed by a processor, causes the processor to:

display an original image;

obtain dominant colors and feature positions of the original image, wherein each feature position corresponds to one dominant color, and different feature positions correspond to different dominant colors;

generate a target pattern for each feature position, wherein a color of the target pattern comprises a dominant color corresponding to the feature position;

display the target pattern at the feature position; and transform the target pattern, and display at least part of a dynamic process of a target pattern transformation;

wherein in terms of obtaining the dominant colors and the feature positions of the original image, the processor is caused to:

process the original image to obtain a first quantity of feature colors and a quantity of pixels corresponding to each feature color;

select, based on the quantity of pixels, a second quantity of feature colors from the first quantity of feature colors as the dominant colors, wherein the second quantity is less than the first quantity; and determine the feature positions based on the dominant colors.

* * * * *